United States Patent
Jeon

(10) Patent No.: US 11,247,647 B2
(45) Date of Patent: Feb. 15, 2022

(54) VEHICLE AND CONTROL METHOD THEREOF

(71) Applicants: Hyundai Motor Company, Seoul (KR); Kia Motors Corporation, Seoul (KR)

(72) Inventor: Dae Seok Jeon, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 237 days.

(21) Appl. No.: 16/555,468

(22) Filed: Aug. 29, 2019

(65) Prior Publication Data
US 2020/0189534 A1    Jun. 18, 2020

(30) Foreign Application Priority Data
Dec. 13, 2018 (KR) .................. 10-2018-0161008

(51) Int. Cl.
*B60T 7/12* (2006.01)
*B60Q 1/52* (2006.01)
*B60Q 5/00* (2006.01)

(52) U.S. Cl.
CPC .............. *B60T 7/12* (2013.01); *B60Q 1/525* (2013.01); *B60Q 5/006* (2013.01); *B60T 2210/32* (2013.01)

(58) Field of Classification Search
CPC ....... B60T 7/12; B60T 2210/32; B60Q 1/525; B60Q 5/006
See application file for complete search history.

(56) References Cited

U.S. PATENT DOCUMENTS

| | | | |
|---|---|---|---|
| 10,762,786 B1* | 9/2020 | Dewey | B60Q 9/008 |
| 2016/0090085 A1* | 3/2016 | Ike | B60W 10/18 701/36 |
| 2018/0061238 A1* | 3/2018 | Lei | G08G 1/167 |
| 2020/0023837 A1* | 1/2020 | Yokoi | B60W 30/0953 |
| 2020/0055495 A1* | 2/2020 | Takaki | B60T 8/17 |

FOREIGN PATENT DOCUMENTS

| | | | | |
|---|---|---|---|---|
| EP | 2165882 A1 * | 3/2010 | | B60Q 1/143 |
| JP | 2017159871 A * | 9/2017 | | G01S 13/931 |

* cited by examiner

*Primary Examiner* — Maceeh Anwari
*Assistant Examiner* — Charles Pall
(74) *Attorney, Agent, or Firm* — Morgan, Lewis & Bockius LLP

(57) ABSTRACT

A vehicle includes: a camera obtaining an external view of the vehicle and acquiring illuminance data; a radar detecting a target object located outside the vehicle and acquiring radar data; and a controller including at least one processor for processing the illuminance data acquired by the camera and the radar data acquired by the radar.

18 Claims, 8 Drawing Sheets

VEHICLE AND CONTROL METHOD THEREOF

CROSS-REFERENCE TO RELATED APPLICATION(S)

This application is based on and claims the benefit of priority to Korean Patent Application No. 10-2018-0161008, filed on Dec. 13, 2018 in the Korean Intellectual Property Office, the entire disclosure of which is incorporated herein by reference.

TECHNICAL FIELD

The present disclosure relates to a vehicle and a control method thereof, and more particularly, to a vehicle and a control method thereof capable of recognizing a target object located in a blind spot.

BACKGROUND

Recently, a system has been developed in which a driver recognizes a pedestrian from an image photographed by a camera provided in front of the vehicle and informs the driver that a pedestrian is located in front of the vehicle, to prepare for the case in which the driver is unable to detect an external situation.

In addition, a system for detecting an object in front of a vehicle using a radar provided in front of the vehicle and notifying the driver that a pedestrian is located in front of the vehicle is being developed.

However, since in case of the image is acquired through the camera, the two-dimensional information is acquired, unlike detecting objects using the three-dimensional coordinate system (X, Y, Z) in the case of a radar installed in front of a vehicle, development of techniques for improving the accuracy of tracking through the position and movement of the target object through the fusion of the radar and the camera has been continued.

On the other hand, there is a problem in that detection and collision determination is delayed for the target object passing through the blind spot, thereby performing warning and various controls.

The present disclosure proposes a method of utilizing various sensors installed in order to solve such a problem.

SUMMARY

One aspect of the present disclosure is to provide a vehicle and a control method thereof that can prevent a collision with a target object appearing in a blind spot by using illuminance information of a streetlight.

A vehicle according to an exemplary embodiment of the present disclosure may include: a camera obtaining an external view of the vehicle and acquiring illuminance data; a radar detecting a target object located outside the vehicle and acquiring radar data; and a controller including at least one processor for processing the illuminance data acquired by the camera and the radar data acquired by the radar, wherein the controller determines a limit time based on the illuminance data, wherein the illuminance data is acquired by detecting lighting of a streetlight located outside the vehicle, and wherein the controller determines the target object as an object of interest and decides a possibility of collision with the object of interest, when a detection time for the target object detected by the radar is within the determined limit time.

The limit time may be a time interval from a time point at which the streetlight outside the vehicle is turned on by the target object to a time point at which the target object is expected to arrive at the detection point, and the detection time is a time interval from a time point at which the streetlight outside the vehicle is turned on by the target object to a time point at which the target object is detected by the radar.

The controller may determine the target object as not the object of interest when the limit time exceeds the detection time.

The controller may decide that the streetlight is turned on by the camera, and may determine a position of the target object based on a position of the streetlight and a detecting radius of the streetlight.

The controller may determine the limit time by dividing a distance from a point of the target object on which the streetlight is turned on to a point on which the target object is detected by the radar, by a predetermined basic speed.

The controller determines the limit time by dividing a distance from a point of the target object on which the streetlight is turned on to a point on which the target object is detected by the radar, by an estimated speed of the target object, wherein the estimated speed may be determined based on a difference between a lighting point of a first bulb and a lighting point of a second bulb, wherein the streetlight includes at least the first bulb and the second bulb.

The controller determines the limit time by dividing a distance from a point of the target object on which the streetlight is turned on to a point where the target object is detected by the radar by a calculation speed of the target object, wherein the calculation speed may be a speed of the target object based on a lighting point of the first bulb, a lighting point of the second bulb, and a distance between the lighting point of the first bulb and the lighting point of the second bulb, wherein the streetlight includes at least the first bulb and the second bulb.

The camera may include an illuminance sensor for measuring illuminance of the streetlight.

The vehicle according to an exemplary embodiment of the present disclosure further comprises a braking system which may transmit a braking control signal to a braking device of the vehicle when the controller decides that the vehicle has a possibility of collision with the object of interest.

The vehicle according to an exemplary embodiment of the present disclosure further includes a warning system which can transmit a warning signal to the object of interest when the controller decides that the vehicle has a possibility of collision with the object of interest.

A control method of a vehicle according to an exemplary embodiment of the present disclosure includes a camera and a radar, the method comprising: acquiring illuminance data; detecting a target object outside the vehicle, and acquiring radar data; and processing the illuminance data acquired by the camera and the radar data acquired by the radar, wherein the illuminance data is acquired by detecting the lighting of a streetlight located outside the vehicle, determining a limit time based on the illuminance data, determining the target object as an object of interest when a detection time for the target object detected by the radar is within the limit time, and deciding a possibility of collision with the object of interest.

The limit time may be a time interval from a time point at which the streetlight outside the vehicle is turned on by the target object to a time point at which the target object is expected to arrive at the detection point, and the detection time may be a time interval from a time point at which the streetlight outside the vehicle is turned on by the target object to a time point at which the target object is detected by the radar.

In the step of deciding a possibility of collision with the object of interest, the target object may be determined as not the object of interest when the limit time exceeds the detection time.

The step of deciding a possibility of collision with the object of interest may include deciding that the streetlight is turned on by the camera and determining a position of the target object based on a position of the streetlight and a detecting radius of the streetlight.

The step of deciding a possibility of collision with the object of interest may include determining the limit time by dividing a distance from a point of the target object on which the streetlight is turned on to a point where the target object is detected by the radar, by a predetermined basic speed.

The step of deciding a possibility of collision with the object of interest may include determining the limit time by dividing the distance from the point of the target object on which lighting of the streetlight is initiated to a point on which the target object is detected by the radar, by an estimated speed of the target object, wherein the estimated speed may be determined based on a difference between a lighting point of the first bulb and a lighting point of the second bulb, wherein the streetlight includes at least a first bulb and a second bulb.

The step of deciding a possibility of collision with the object of interest may include determining the limit time by dividing a distance from a point of the target object on which lighting of the streetlight is initiated to a point where the target object is detected by the radar, by a calculation speed of the target object, wherein the calculation speed may be determined based on a lighting point of the first bulb, a lighting point of the second bulb, and a distance between the lighting point of the first bulb and the lighting point of the second bulb, wherein the streetlight includes at least a first bulb and a second bulb.

The control method of a vehicle according to an exemplary embodiment of the present disclosure may further include transmitting a warning signal to the object of interest when the vehicle decides that there is a possibility of collision with the object of interest.

The control method of a vehicle according to an exemplary embodiment of the present disclosure may further include transmitting a braking signal to the object of interest when the vehicle decides that there is a possibility of collision with the object of interest.

A computer program according to an exemplary embodiment of the present disclosure is stored on a non-transitory recording medium for executing steps of: acquiring illuminance data in combination with a computing device; detecting a target object external to the vehicle and acquiring radar data; and processing the illuminance data and the radar data, wherein the illuminance data is acquired by detecting lighting of a streetlight located outside the vehicle, determining a limit time based on the illuminance data, determining a target object as an object of interest when the detection time of the target object detected by the radar is within the limit time, and deciding a possibility of collision with the object of interest.

According to an aspect of the present disclosure, it is possible to prevent a collision accident with a target object coming from a blind spot when passing through an intersection.

DETAILED DESCRIPTION

Figure 1:
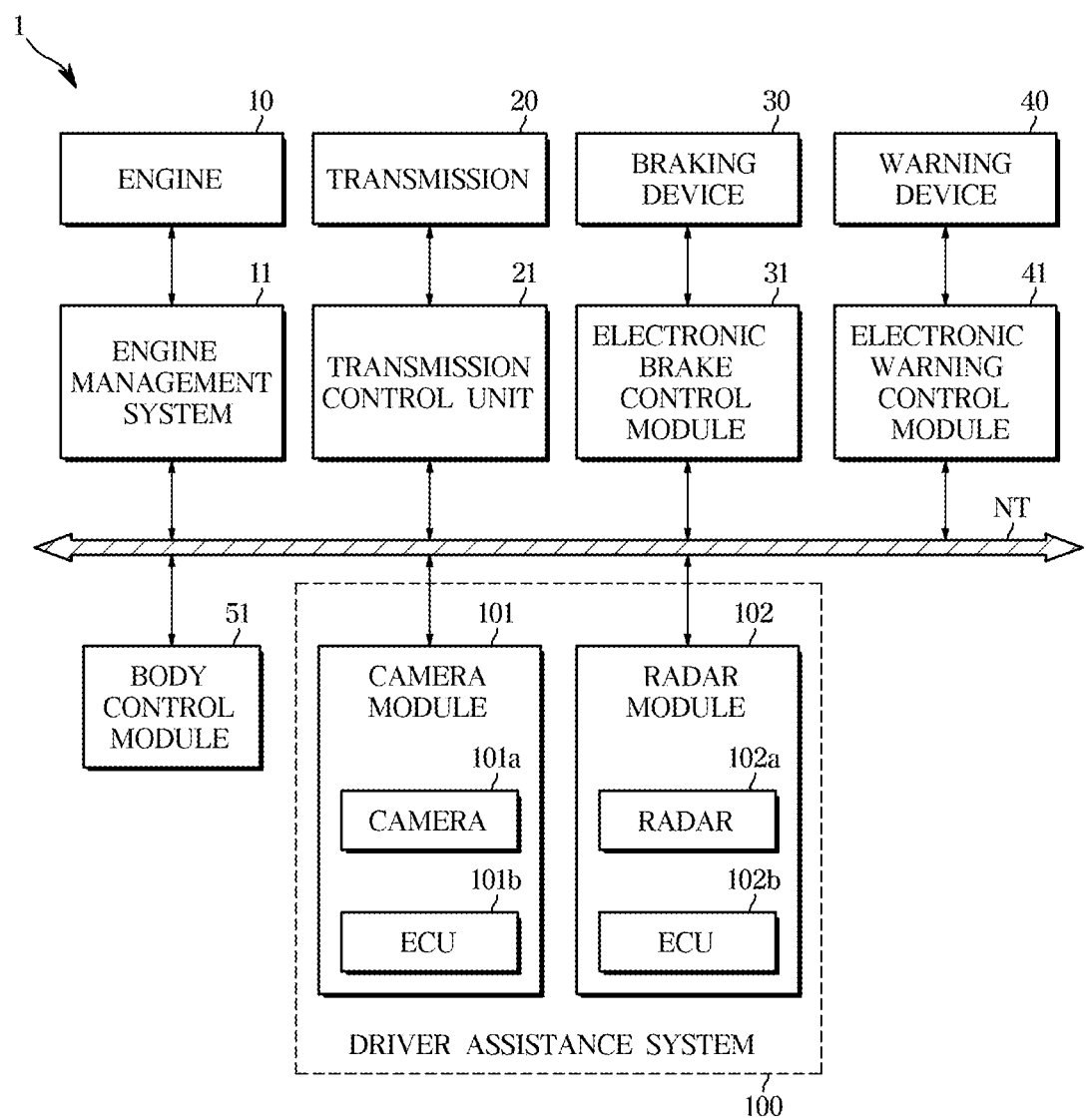
FIG. 1 shows a configuration of a vehicle according to an exemplary embodiment of the present disclosure.

Like reference numerals refer to like elements throughout the specification. This specification does not describe all the elements of the embodiments, and the general contents of the related art or duplicative contents in the embodiments will be omitted. The terms "unit," "module," "member," and "block" used herein may be implemented by hardware or software. It is also possible that a plurality of units, modules, members, and blocks are implemented as one element, or one unit, module, member, or block includes a plurality of elements in accordance with the embodiments.

Throughout the specification, when an element is referred to as being "connected" to another element, it may be directly connected or indirectly connected to another element. The indirect connection may include, for example, a connection through a wireless communication network.

In addition, when some part "includes" some elements, unless explicitly described to the contrary, it means that other elements may be further included but not excluded.

Throughout the specification, when a member is referred to as being located "on" another member, a third member may be present between the two members in addition to the two members being in contact.

The terms such as "first" or "second" may be used to distinguish one element from another, but the elements are not limited to the terms Singular forms are intended to include plural forms unless the context clearly indicates otherwise.

Reference numerals of operations are used for convenience of description, and the reference numerals do not indicate the order of the operations. The operations may be performed in an order that is different from the described order unless a specific order is clearly described in context.

Hereinafter, an operation principle and exemplary embodiments of the present disclosure will be described with reference to the accompanying drawings.

FIG. 1 shows a configuration of a vehicle 1 according to an exemplary embodiment of the present disclosure.

As shown in FIG. 1, the vehicle 1 includes an engine 10, a transmission 20, a braking device 30, and a warning device 40. The engine 10 includes a cylinder and a piston, and can generate power for driving the vehicle 1. The transmission 20 includes a plurality of gears, and is capable of transmitting the power generated by the engine 10 to the wheels. The braking device 30 can decelerate or stop the vehicle 1 through friction with the wheel. The warning device 40 can transmit a warning signal to the driver of the vehicle 1 or the driver of the other vehicle.

For example, the warning device 40 may call attention through a speaker or a display provided in the vehicle 1 if there is a possibility of collision with another vehicle, or may transmit a signal to inform the driver of another vehicle of the risk of collision.

The vehicle 1 may comprise a plurality of electrical components. For example, the vehicle 1 may further include an engine management system (EMS) 11, a transmission control unit (TCU) 21, an electronic brake control module 31, an electronic warning control module 41, a body control module (BCM) 51, and a driver assistance system (DAS) 100.

The engine management system 11 can control the engine 10 in response to the driver's acceleration intent through the accelerator pedal or the request of the driver assistance system 100. For example, the engine management system 11 can control the torque of the engine 10.

The transmission control unit 21 can control the transmission 20 in response to the shift command of the driver through the shift lever and/or the running speed of the vehicle 1. For example, the transmission control unit 21 can adjust the shift ratio from the engine 10 to the wheels.

The electronic brake control module 31 may control the braking device 30 in response to the operator's braking intent through the braking pedal and/or the slip of the wheels.

For example, the electronic brake control module 31 can temporarily release the braking of the wheel in response to the slip of the wheel detected in braking of the vehicle 1 (Anti-lock Braking Systems, ABS).

The electronic brake control module 31 can selectively release the braking of the wheel in response to oversteering and/or understeering detected in steering of the vehicle 1 (Electronic stability control, ESC).

In addition, the electronic brake control module 31 can temporarily brake the wheels in response to the slip of the wheel detected in driving of the vehicle 1 (Traction Control System, TCS).

The electronic warning control module 41 can assist the operation of the warning device 40 so as to inform the driver of the possibility of collision with the vehicle 1 by detecting an external vehicle.

The body control module 51 can control the operation of electrical components that provide convenience to the driver or ensure the safety of the driver. For example, the body control module 51 may control a head lamp, a wiper, a cluster, a multifunction switch, a direction indicator lamp or the like.

The driver assistance system 100 can assist the driver in operating (driving, braking, steering) the vehicle 1. For example, the driver assistance system 100 can detect the environment around the vehicle 1 (for example, a streetlight, another vehicle, a pedestrian, a lane, a road sign, etc.) and control the driving and/or braking and/or steering of the vehicle 1 in response to the detected environment.

The driver assistance system 100 can provide various functions to the driver. For example, the driver assistance system 100 may provide a lane departure warning (LDW), a lane keeping assist (LKA), a high beam assist (HBA), an automatic emergency braking), an autonomous emergency braking (AEB), a traffic sign recognition (TSR), a smart cruise control (SCC), and a blind Spot detection (BSD).

The driver assistance system 100 includes a camera module 101 for acquiring image data and illuminance data around the vehicle 1 and a radar module 102 for acquiring radar data around the vehicle 1.

The camera module 101 includes a camera 101a and an electronic control unit (ECU) 101b, and can photograph the front of the vehicle 1 and recognize the streetlight, the illuminance of the streetlight, other vehicles, a pedestrian, a lane, a road sign or the like.

The camera module 101 may include an illuminance sensor (not shown). The illuminance sensor acquires illuminance data so as to confirm whether the streetlight is turned on/off, by measuring the amount of light of the area recognized by the camera Specifically, the camera module 101 may be provided with the illuminance sensor to decide a light-on or off condition of the streetlight. Further, the camera module 101 can identify a position of the streetlight, the time of light-on or the time of the light-off or the like, and transmit it to the controller 140.

The radar module 102 includes a radar 102a and a controller 102b and can acquire relative position, relative speed or the like of objects (e.g., other vehicles, pedestrians, etc.) around the vehicle 1.

The above electronic components can communicate with each other through the vehicle communication network NT. For example, the electrical components can transmit and receive data through an ethernet, a media oriented systems transport (MOST), a flexray, a controller area network (CAN), a local interconnect network (LIN).

Figure 2:
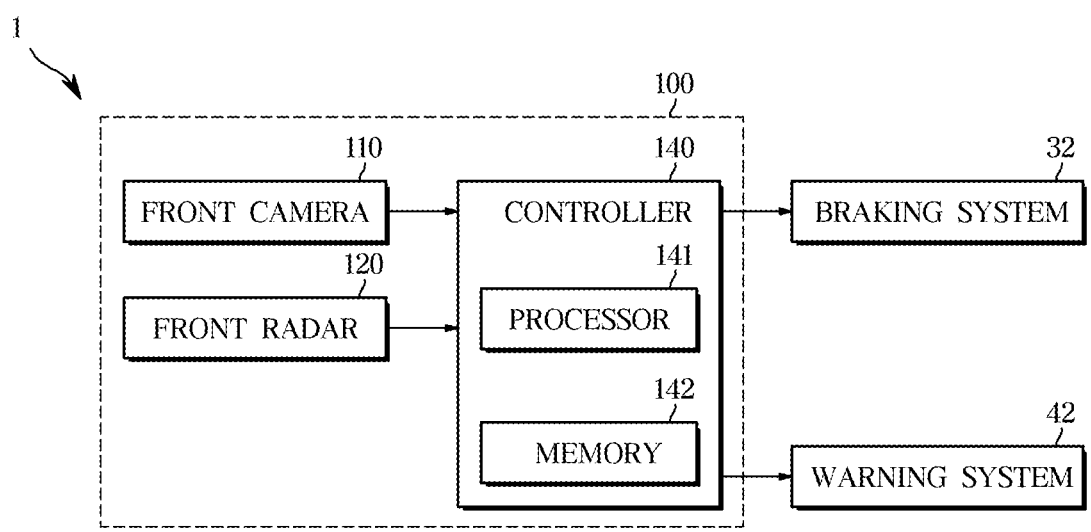
FIG. 2 shows a configuration of a driver assistance system according to an exemplary embodiment of the present disclosure.

For example, the driver assistance system 100 can transmit a drive control signal, a braking signal, and a steering signal via the vehicle communication network NT to the engine management system 11, the electronic brake control module 31, and the electronic warning control module 41, respectively, FIG. 2 shows a configuration of a driver assistance system 100 according to an exemplary embodiment of the present disclosure.

As shown in FIG. 2, the vehicle 1 may include a braking system 32, a warning system 42, and a driver assistance system 100.

The braking system 32 includes an electronic brake control module 31 (see FIG. 1) and a braking device 30 (see FIG. 1) described in conjunction with FIG. 1 and the steering system 42 includes an electronic warning control module 41 (see FIG. 1) and a warning device 40 (see FIG. 1).

Figure 3:
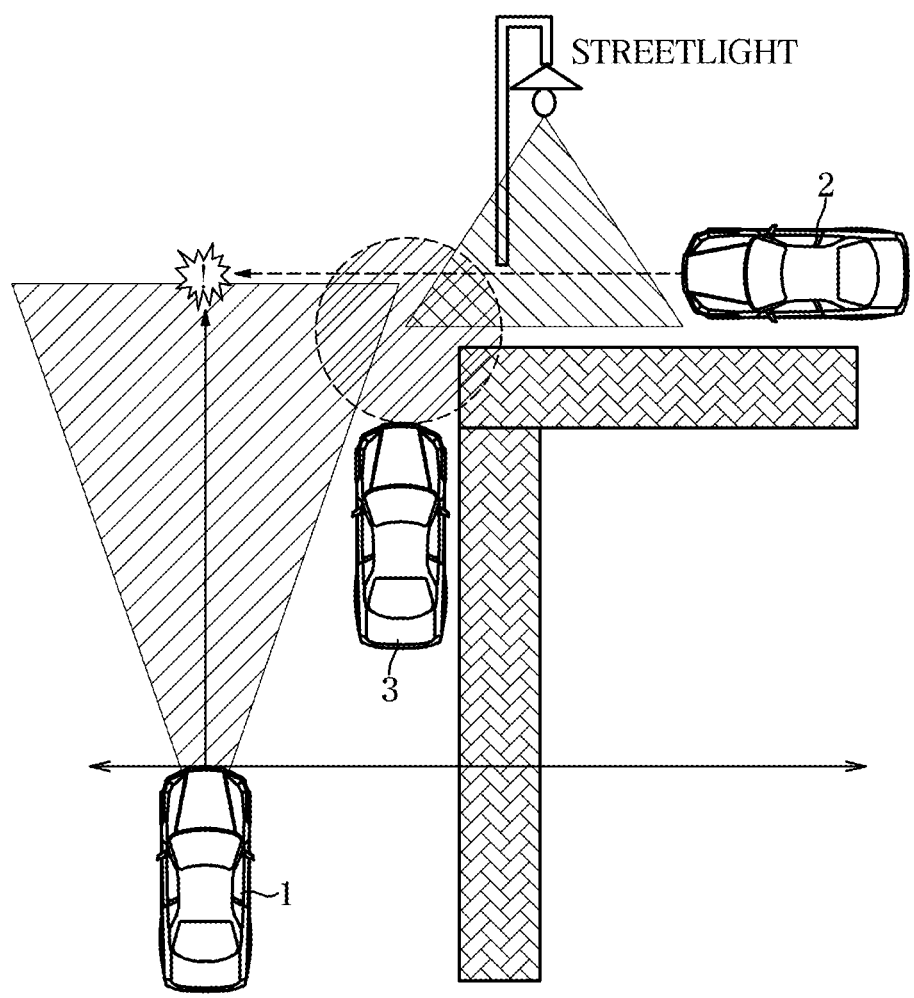
FIG. 3 shows a situation in which a vehicle equipped with a driver assistance system according to an exemplary embodiment of the present disclosure is traveling.

The driver assistance system 100 may include a front camera 110 and a front radar 120. The front camera 110 may have a field of view facing the front of the vehicle 1 as shown in FIG. 3. The front camera 110 may be installed, for example, in the front wind shield of the vehicle 1.

The front camera 110 can photograph the front of the vehicle 1 and acquire image data and illuminance data in front of the vehicle 1. The image data in front of the vehicle 1 may include position information about other vehicles or pedestrians or lanes located in front of the vehicle 1. Further, the front camera 110 determines the brightness of the front of the vehicle based on the image data, and makes it possible to decide whether the streetlight outside the vehicle 1 is turned on/off.

The front camera 110 may include a plurality of lenses and an image sensor. The image sensor may include a plurality of photodiodes for converting light into electrical signals, and a plurality of photodiodes may be arranged in a two-dimensional matrix. Further, the front camera 110 includes an illuminance sensor so that it is possible to judge whether the streetlight outside the vehicle 1 is turned on/off based on the detected light quantity.

The front camera 110 may be electrically connected to the controller 140. For example, the front camera 110 may be connected to the controller 140 through a vehicle communication network NT, or may be connected to the controller 140 through a hard wire, or may be connected to the control unit 140 through a printed circuit board (PCB).

The front camera 110 may transmit the image data and the illuminance data in front of the vehicle 1 to the controller 140.

The front radar 120 may have a field of sensing facing the front of the vehicle 1 as shown in FIG. 3. The front radar 120 may be installed in, for example, a grille or a bumper of the vehicle 1.

The front radar 120 may include a transmitting antenna (or a transmitting antenna array) that radiates a transmission radio wave toward the front of the vehicle 1 and a receiving antenna (or a receiving antenna array) that receives a reflected radio waves reflected from the object. The front radar 120 can acquire the front radar data from the transmission radio wave transmitted by the transmission antenna and the reflection radio wave received by the reception antenna. The radar data may include distance information and speed information about other vehicles or pedestrians located in front of the vehicle 1.

The front radar 120 can determine the state distance to the object based on the phase difference (or time difference) between the transmission radio wave and the reflection radio wave and can determine the relative speed of the object based on the frequency difference between the transmission radio wave and the reflection radio wave.

The front radar 120 may be connected to the controller 140 via, for example, the vehicle communication network NT or a hard wire or a printed circuit board. The front radar 120 may transmit the front radar data to the controller 140.

The controller 140 includes a processor 141 and a memory 142.

The processor 141 may process the image data and illumination data of the front camera 110 and the radar data of the front radar 120, and generate a braking signal and a steering signal for controlling the braking system 32 and the warning system 42. For example, the processor 141 may include an image signal processor for processing image data of the front camera 110 and/or a digital signal processor for processing radar data of the radars 120 and 130 and/or a micro control unit (MCU) for generating a braking signal and a steering signal.

The processor 141 detects objects (for example, other vehicles, pedestrians, etc.) in front of the vehicle 1 based on the front image data of the front camera 110, the front radar data of the front radar 120, and the corner radar data of the plurality of corner radars 130.

Specifically, the processor 141 can acquire the position information (distance and direction) speed information (relative speed) of the objects in front of the vehicle 1 based on the front radar data of the front radar 120 and the corner radar data of the plurality of corner radars 130.

The processor 141 can obtain the position information (direction) and type information (e.g., whether the object is a different vehicle or a pedestrian) of the objects in front of the vehicle 1 based on the front image data of the front camera 110.

In addition, the processor 141 can match the objects detected by the forward image data to the object detected by the front radar data, and can acquire the type information, position information, and speed information of the front objects of the vehicle 1 based on the matching result.

The processor 141 may generate the braking signal and the steering signal based on the type information, the position information, and the speed information of the front objects.

For example, the processor 141 may determine the time to the collision (TTC) between the vehicle 1 and the front object based on the position information (distance) and the speed information (relative speed) of the front objects and may warn the driver of the collision or transmit a braking signal to the braking system 32, based on the result of the comparison between the time to collision and a predetermined reference time. In response to a time to a collision less than a predetermined first reference time, the processor 141 may cause a warning via audio and/or display to be output. In response to a time to a collision less than a predetermined second reference time, the processor 141 may transmit a pre-braking signal to the braking system 32. In response to a time to a collision less than a predetermined third reference time, the processor 141 may transmit an emergency braking signal to the braking system 32. At this time, the second reference time is smaller than the first reference time, and the third reference time is smaller than the second reference time.

In another example, the processor 141 may determine the distance (DTC) to the collision based on the speed information (relative speed) of the front objects, and may warn the driver of the collision or transmit a braking signal to the braking system 32, based on the result of the comparison between the distance to the collision and the distance to the front objects.

Further, the processor 141 may warn the driver of the collision or transmit the steering signal to the steering system 42 based on the result of the comparison between the time to the collision and the predetermined reference time. In response to a time to a collision less than a predetermined first reference time, the processor 141 may cause a warning via audio and/or display to be output. In response to a time to a collision less than a predetermined second reference time, the processor 141 may transmit a pre-steering signal to the steering system 42.

In response to a time to a collision less than a predetermined third reference time, the processor 141 may send an emergency steering signal to the steering system 42. At this time, the second reference time is smaller than the first reference time, and the third reference time is smaller than the second reference time.

In another example, the processor 141 determines a distance to collision (DTC) based on the speed information (relative speed) of the front objects, and determines may warn the driver of the collision based on the result of the comparison between the distance to the collision and the distance to the front objects.

The memory 142 may store program and/or data for the processor 141 to process image data, and program and/or data for processing radar data, and program and/or data for the processor 141 to generate the braking signal and/or the steering signal.

The memory 142 can temporarily memorize the image data received from the front camera 110 and/or the radar data received from the radars 120 and 130, and temporarily memorize the processing result of the image data and/or the radar data of the processor 141.

The memory 142 may be non-volatile memories such as a flash memory, a read only memory (ROM), an erasable programmable read only memory (EPROM), or the like, as well as volatile memories such as an S-RAM and a D-RAM or the like.

FIG. 3 shows a situation in which a vehicle equipped with a driver assistance system 100 according to an exemplary embodiment of the present disclosure is traveling.

As shown in FIG. 3, in a situation where the vehicle 1 equipped with the driver assistance system 100 is traveling, the driver cannot detect the other vehicle 2 in the blind spot of the intersection. In this case, the other vehicle 2 refers to a target object having a possibility of collision with the vehicle 1 by appearing from a blind spot, and in FIG. 3, the vehicle is a representative example but the target object is not limited to the vehicle, and can be a pedestrian, an animal, or the like.

Conventionally, in order to determine the possibility of collision with another vehicle 2, the existing system was decided the relative distance to the vehicle 1 through image processing when another vehicle 2 is found in the image acquired through the camera, or was decided the relative distance to the vehicle 1 based on the time difference between the transmission radio wave and the reflection radio wave through the radar.

However, the existing system can decide the collision only if the target object is detected in the camera or the radar field of the vehicle 1, and can be subjected to the collision analysis immediately after leaving the blind spot if the target object is in the blind spot. For example, as shown in FIG. 3, the vehicle 1 cannot detect the other vehicle 2 because the view is blocked by another vehicle 3 or an obstacle of an intersection. Therefore, the vehicle 1 can decide the possibility of collision after the other vehicle 2 is captured in the front view of the vehicle 1.

The disclosed apparatus/method can detect that another vehicle 2 that is invisible due to a blind spot approaches the vehicle 1, by using the illuminance difference of a streetlight located at an intersection when the vehicle 1 cannot directly detect another vehicle 2 present in a blind spot.

The streetlight, which is referred to in various exemplary embodiments of the present disclosure, may be smart streetlights that are being introduced rapidly in recent years. A smart streetlight may be equipped with, for example, CCTVs, sensing sensors, sound sensors, and environmental sensors to collect and provide various information. For example, when the target object approaches the smart streetlight through the sensing sensor, energy can be saved by switching from the light-on state to the light-off state. In addition, the smart streetlight can provide information to security services, etc. by recognizing the accident or crime situation around them through the CCTV and acoustic sensor.

The driver assistance system 100 according to an exemplary embodiment of the present disclosure may recognize the illuminance difference of the streetlight described above and can identify in advance whether the external vehicle 2 is approaching the vehicle 1. Here, the vehicle 1 can acquire information on the position and speed of the target object using at least one of the illuminance sensor and the camera provided in the vehicle 1. This can be acquired by recognizing the illuminance difference of the streetlight, and the method of acquiring information according to the specific streetlight type will be described below.

Figure 4:
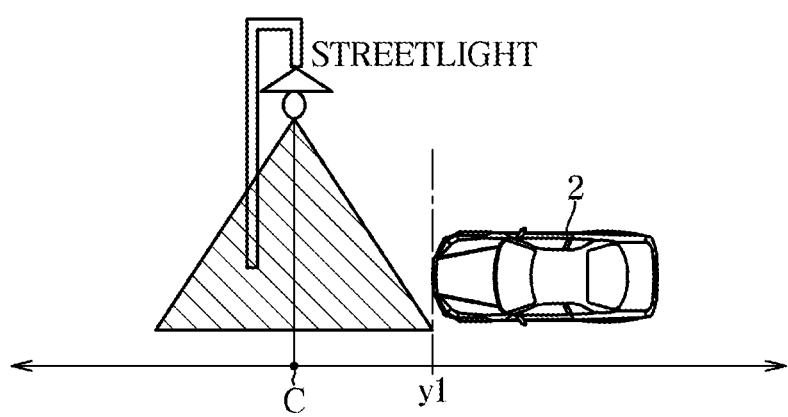
FIGS. 4 to 6 are diagrams for explaining acquiring motion information of the target vehicle based on the illuminance of the streetlight according to exemplary embodiments of the present disclosure.
Figure 5:
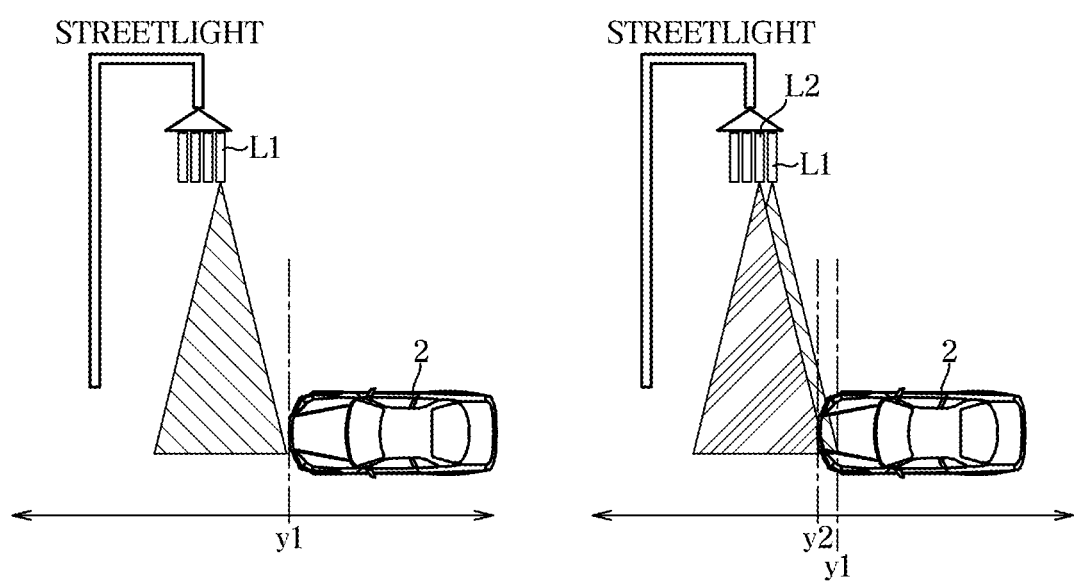
Figure 6:
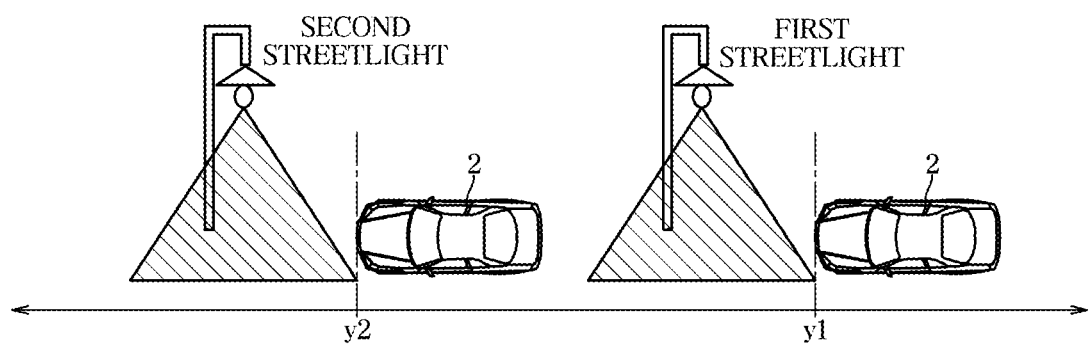

FIGS. 4 to 6 are diagrams for explaining acquiring motion information of the target vehicle based on the illuminance of the streetlight according to exemplary embodiments of the present disclosure. More specifically, FIG. 4 shows a case where one streetlight including a single light bulb is located at an intersection corner position, FIG. 5 shows a case where one streetlight including a plurality of light bulbs is located at an intersection corner position, and FIG. 6 shows a case where a plurality of streetlights are located in a lane orthogonal to the vehicle 1. Hereinafter, the process of acquiring motion information for the other vehicle 2 in each situation will be described in detail. The following description will be referred to together with FIG. 3

As shown in FIG. 4, the other vehicle 2 approaches from the lane orthogonal to the vehicle 1 toward the streetlight. At this time, the streetlight is turned on instantly when the streetlight detects that the target object approaches within a certain radius. The position of the other vehicle 2 can be accurately known by adding a predetermined distance to the position of the other vehicle 2, specifically, the illuminance center. Also, the illuminance center will be the same as the position of the streetlight. For example, when the streetlight is turned on, the vehicle 1 can identify the position C of the streetlight, and can identify the position y1 of the vehicle using the detection radius (C to y1) of the streetlight. Therefore, the vehicle 1 can sense the illuminance of the streetlight and can identify the position of another vehicle 2 at a specific point in time.

As shown in FIG. 5, the other vehicle 2 approaches from the lane orthogonal to the vehicle 1 toward the streetlight. The streetlight in FIG. 5 may include a plurality of bulbs. Commonly used smart streetlights may adopt multiple light-emitting diode (LED) bulbs instead of single bulbs to improve power efficiency. In the present exemplary embodiment, information on the position and speed of the other vehicle 2 is acquired in consideration of this characteristic.

Here, it is assumed that the streetlight includes at least the first bulb L1 and the second bulb L2. Here, the first bulb L1 is located at the outermost side of the streetlight, and corresponds to a light source that is firstly turned on when a target object is detected. The second bulb L2 is a light source that is next to the first bulb L1 and is subsequently turned on.

For example, information on the speed of the other vehicle 2 can be acquired by using the position y1 and the viewpoint of the vehicle 2 when the first bulb L1 is turned on and the position y2 and the viewpoint of the vehicle 2 when the second bulb L2 is turned on. At this time, the method of acquiring the respective positions (y1, y2) refers to the method shown in FIG. 4.

As shown in FIG. 6, the other vehicle 2 passes through a plurality of streetlights in a lane orthogonal to the vehicle 1. The streetlight in FIG. 6 is plurality of streetlights including at least a first streetlight and a second streetlight. In the case of a plurality of streetlights, it is possible to acquire information on the speed of the other vehicle 2 through the distance between the streetlights and the interval information of the turn-on time of streetlights.

On the other hand, in the above, it has been described that the information on the motion state of the other vehicle 2 is acquired by using the illumination data of the streetlight by the camera of the vehicle 1. Hereinafter, a series of calculation processes performed in order to identify in advance whether there is a possibility of collision of the other vehicle 2 with the vehicle 1 will be described in detail based on information on the acquired motion state.

Figure 7:
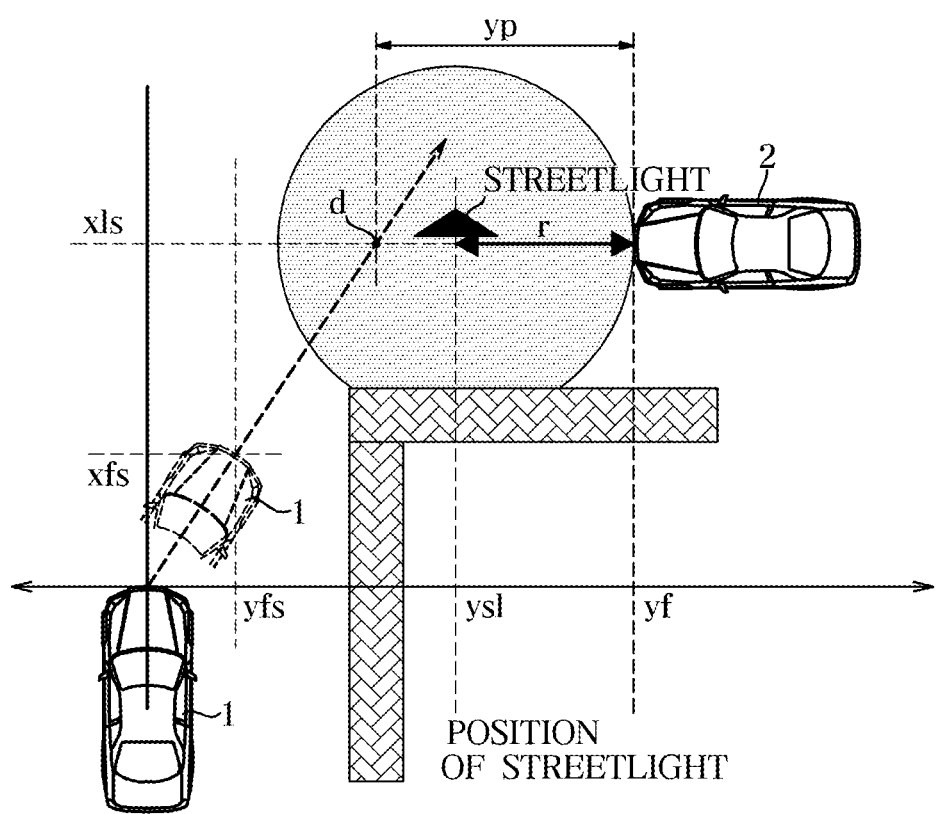
FIG. 7 is a diagram for explaining a calculation method for determining an object of interest according to an exemplary embodiment of the present disclosure.

FIG. 7 is a diagram for explaining a calculation method for determining an object of interest. This will be described below with reference to FIG. 7.

The object of interest refers to a decision object or a control object to be set in advance if there is a possibility that another vehicle 2 that may appear in the blind spot 2 may collide with the vehicle 1. The driver assistance system 100 decides the possibility of collision between the object of interest and the vehicle 1 when the target object is determined to be an object of interest. By setting an object of interest, it is possible to overcome the limitations of recognition or collision decision for the target object passing through a blind spot.

In order to determine the target object (for example, another vehicle 2) as an object of interest, the driver assistance system 100 determines the time limit based on the illumination data acquired by the camera and determines a target object as an object of interest when the detection time of the object detected by the radar is within the limit time.

Here, the limit time is an interval of time at which another vehicle 2 is expected to arrive at the detection point (d) from the time when the streetlight outside the vehicle 1 is turned on by the other vehicle 2. In other words, the time limit refers to the valid time to select as the control object for the target object detected by the radar. The detection time is an interval of time at which the other vehicle 2 is detected by the radar provided in the vehicle 1 from the time when the streetlight outside the vehicle 1 is turned on by the other vehicle 2.

If the detection time is within the limit time, the vehicle 1 will be recognized to the possibility of a collision with the other vehicle 2. Therefore, the driver assistance system 100 can select the other vehicle 2 as an object of interest, start the decision of the possibility of collision with the object of interest in advance, and efficiently select the control object. On the contrary, if the limit time is shorter than the detection time, the vehicle 1 can be decided to have a low possibility of collision with the other vehicle 2 and can be excluded from the object of interest.

When the driver assistance system 100 determines an object of interest, the driver assistance system 100 tracks the movement of the object of interest by the radar and decides the possibility of collision with the vehicle 1.

Next, various methods for determining the limit time will be described with reference to FIGS. 4 to 6.

The limit time according to FIG. 4 cannot be predicted from the speed of the other vehicle 2, and can be determined by introducing a predetermined basic speed. For example, the predetermined basic speed, which is an average speed at which a vehicle is decelerated to rotate at an intersection, may be 8 m/h. Here, the limit time may be a value acquired by dividing the distance yp from the point yf of the other vehicle 2 where the streetlight is turned on to the point d where the other vehicle 2 is detected by the radar, by the predetermined basic speed.

The time limit according to FIG. 5 may be a value acquired by dividing the distance y2, from the point y1 of the other vehicle 2 where the streetlight is turned on to the point d where the other vehicle 2 is detected by the radar, by the estimated speed. Here, the estimated speed may be determined based on a difference between a lighting point of the first bulb and a lighting point of the second bulb, wherein the streetlight includes at least the first bulb and the second bulb.

The time limit according to FIG. 6 may be a value acquired by dividing the distance yp from the point yf of the other vehicle 2 where the streetlight is turned on to the point d where the other vehicle 2 is detected by the radar, by the calculation speed. Here, the calculation speed may be determined based on a lighting point of the first bulb, a lighting point of the second bulb and a distance between the lighting point of the first bulb and the lighting point of the second bulb, wherein the streetlight includes at least the first bulb and the second bulb.

Here, the distance yp to the detection point d of the other vehicle 2, that is the distance yp from the point yf of the other vehicle 2 to the point d at which the other vehicle 2 is detected by the radar can be determined using the formula yp=yf−(xls/xfs) xyfs which uses a proportional expression based on the relative speed of the vehicle 1.

Figure 8:
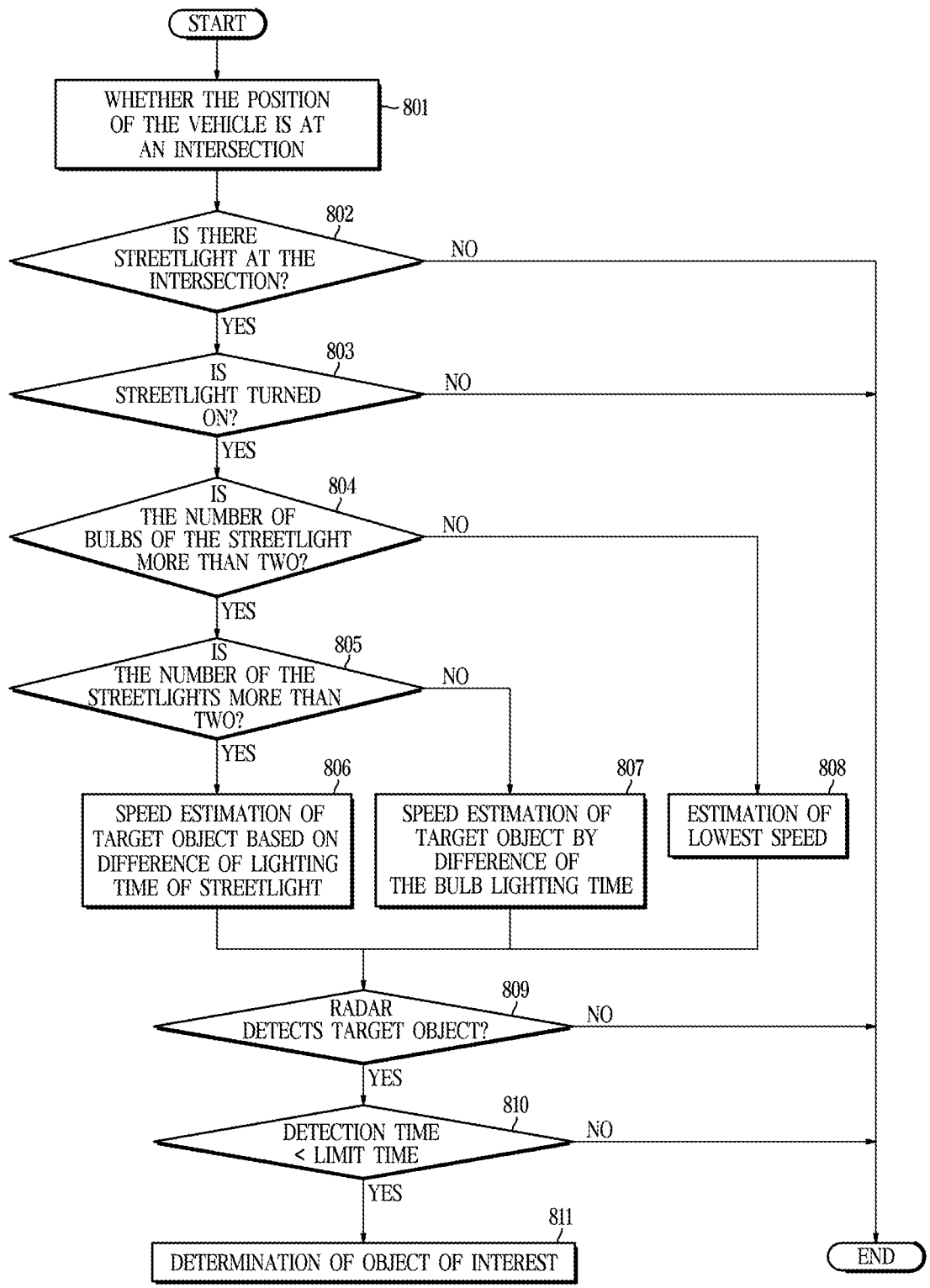
FIG. 8 is a flowchart of a method of controlling a vehicle according to an exemplary embodiment of the present disclosure.

FIG. 8 is a flowchart of a method of controlling a vehicle according to an exemplary embodiment of the present disclosure. However, it should be understood that the present disclosure is not limited thereto and that some steps may be added or deleted as needed. In addition, the subject performing each step may be each configuration of the driver assistance system 100 each configuration and its integrated form First, the driver assistance system 100 confirms whether the position of the vehicle is at an intersection (801). If the position of the vehicle is located at the intersection, it is decided whether the streetlight exists at an intersection (802), whether the streetlight is turned on (803), whether bulbs of the streetlight is two or more (804) and whether the number of the streetlight is two or more (805).

If the number of bulbs of the streetlight is two or more, the speed of the target object is estimated based on the difference of the streetlight lighting time (806), and if the number of the streetlights is one and the number of the bulbs is plural, the speed of the target object is estimated by the difference of the bulb lighting time (807). If the number of streetlights having a single bulb is one, the limit time can be estimated according to the lowest speed (808). In order to avoid duplication of descriptions, the specific calculation method will be described with reference to FIGS. 3 to 7.

The radar detects the target object at the detection point d (809) and determines the detection time. The detection time is the interval of time when another vehicle is detected by the radar from the time when the streetlight outside the vehicle is turned on by another vehicle as described above.

The driver assistance system 100 determines the target object of interest by comparing the detection time and the limit time (810).

If the target object is determined as an object of interest in step 811, the braking system or the warning system is activated. For example, the warning system may generate a signal that flashes the light of the vehicle or activates the klaxon to transmit a warning signal to another vehicle. In addition, the warning system can transmit a warning message to the driver of the vehicle through the human machine interface (HMI). At this time, there is an advantage that the warning message can be delivered faster than the existing auxiliary system. The braking system can control the vehicle to travel at a low speed so that the vehicle does not collide with another vehicle, and can generate a control signal to perform an autonomous emergency braking (AEB) in case of the risk of collision with another vehicle.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

The embodiments disclosed with reference to the accompanying drawings have been described above. It will be understood by those skilled in the art that various changes in form and details may be made without departing from the spirit and scope of the disclosure as defined by the appended claims. The disclosed embodiments are illustrative purposes only and should not limit the present disclosure.

What is claimed is:

1. A vehicle, comprising:
a camera obtaining an external view of the vehicle and acquiring illuminance data;
a radar detecting a target object located outside the vehicle and acquiring radar data; and
a controller including at least one processor for processing the illuminance data acquired by the camera and the radar data acquired by the radar,
wherein the controller determines a limit time based on the illuminance data,
wherein the illuminance data is acquired by detecting lighting of a streetlight located outside the vehicle,
wherein the controller determines the target object as an object of interest when a detection time for the target object detected by the radar is within the determined limit time, and the controller decides a possibility of collision with the object of interest, and
wherein the controller decides that the streetlight is turned on by the camera, and determines a position of the target object based on a position of the streetlight and a detecting radius of the streetlight.

2. The vehicle of claim 1,
wherein the limit time is a time interval from a time point at which the streetlight outside the vehicle is turned on by the target object to a time point at which the target object is expected to arrive at the detection point, and the detection time is a time interval from a time point at which the streetlight outside the vehicle is turned on by the target object to a time point at which the target object is detected by the radar.

3. The vehicle of claim 1,
wherein the controller determines the target object as not the object of interest if the limit time exceeds the detection time.

4. The vehicle of claim 1,
wherein the controller determines the limit time by dividing a distance from a point of the target object on which the streetlight is turned on to a point on which the target object is detected by the radar, by a predetermined basic speed.

5. The vehicle of claim 1,
wherein the controller determines the limit time by dividing a distance from a point of the target object on which the streetlight is turned on to a point on which the target object is detected by the radar, by an estimated speed of the target object,
wherein the estimated speed is determined based on a difference between a lighting point of a first bulb and a lighting point of a second bulb, and
wherein the streetlight includes at least the first bulb and the second bulb.

6. The vehicle of claim 1,
wherein he controller determines the limit time by dividing a distance from a point of the target object on which the lighting of the streetlight is initiated to a point where the target object is detected by the radar, by a calculation speed of the target object,
wherein the calculation speed is determined based on a lighting point of the first bulb, a lighting point of the second bulb, and a distance between the lighting point of the first bulb and the lighting point of the second bulb, and wherein the streetlight includes at least the first bulb and the second bulb.

7. The vehicle of claim 1,
wherein the camera includes an illuminance sensor for measuring illuminance of the streetlight.

8. The vehicle of claim 1,
further comprising a braking system,
wherein the braking system transmits a braking control signal to a braking device of the vehicle when the controller decides that the vehicle has a possibility of collision with the object of interest.

9. The vehicle of claim 1,
further comprising a warning system,
wherein the warning system transmits a warning signal to the object of interest when the controller decides that the vehicle has a possibility of collision with the object of interest.

10. A control method of a vehicle comprising a camera and a radar, comprising:
acquiring illuminance data;
detecting a target object outside the vehicle, and acquiring radar data; and
processing the illuminance data acquired by the camera and the radar data acquired by the radar, wherein the illuminance data is acquired by detecting lighting of a streetlight located outside the vehicle, determining a limit time based on the illuminance data, determining the target object as an object of interest when a detection time for the target object detected by the radar is within the limit time, and deciding a possibility of collision with the object of interest,
wherein the deciding a possibility of collision with the object of interest includes deciding that the streetlight is turned on by the camera and determining a position of the target object based on a position of the streetlight and a detecting radius of the streetlight.

11. The control method of a vehicle of claim 10,
wherein the limit time is a time interval from a time point at which the streetlight outside the vehicle is turned on by the target object to a time point at which the target object is expected to arrive at the detection point, and the detection time is a time interval from a time point at which the streetlight outside the vehicle is turned on by the target object to a time point at which the target object is detected by the radar.

12. The control method of a vehicle of claim 10,
wherein, in the deciding a possibility of collision with the object of interest, the target object is determined as not the object of interest when the limit time exceeds the detection time.

13. The control method of a vehicle of claim 10,
wherein the deciding a possibility of collision with the object of interest includes determining the limit time by dividing a distance from a point of the target object on which the streetlight is turned on to a point where the target object is detected by the radar, by a predetermined basic speed.

14. The control method of a vehicle of claim 10,
wherein deciding a possibility of collision with the object of interest includes determining the limit time by dividing a distance from a point of the target object on which the streetlight is turned on to a point on which the target object is detected by the radar, by an estimated speed of the object, wherein the estimated speed is determined based on a difference between a lighting point of the first bulb and a lighting point of the second bulb, and wherein the streetlight includes at least the first bulb and the second bulb.

15. The control method of a vehicle of claim 10, wherein the deciding a possibility of collision with the object of interest includes determining the limit time by dividing a distance from a point of the target object on which the lighting of the streetlight is initiated to a point where the target object is detected by the radar, by a calculation speed of the target object, wherein the calculation speed is a speed of the target object determined based on a lighting point of the first bulb, a lighting point of the second bulb, and a distance between the lighting point of the first bulb and the lighting point of the second bulb, and wherein the streetlight includes at least the first bulb and the second bulb.

16. The control method of a vehicle of claim 10, further comprising transmitting a warning signal to the object of interest when the vehicle decides that there is a possibility of collision with the object of interest.

17. The control method of a vehicle of claim 10, further comprising transmitting a braking signal to the vehicle when the vehicle decides that there is a possibility of collision with the object of interest.

18. A computer program stored on a non-transitory recording medium, for executing steps of:

acquiring illuminance data in combination with a computing device;

detecting a target object external to a vehicle and acquiring radar data; and processing the illuminance data and the radar data, wherein the illuminance data is acquired by detecting lighting of a streetlight located outside the vehicle, determining a limit time based on the illuminance data, determining the target object as an object of interest when the detection time of a target object detected by a radar is within the limit time, and deciding a possibility of collision with the object of interest, wherein the deciding a possibility of collision with the object of interest includes deciding that the streetlight is turned on by the camera and determining a position of the target object based on a position of the streetlight and a detecting radius of the streetlight.

* * * * *